May 25, 1926.
G. T. STRITE
SELF CLEANING HOE
Filed July 2, 1923
1,585,944
2 Sheets-Sheet 1
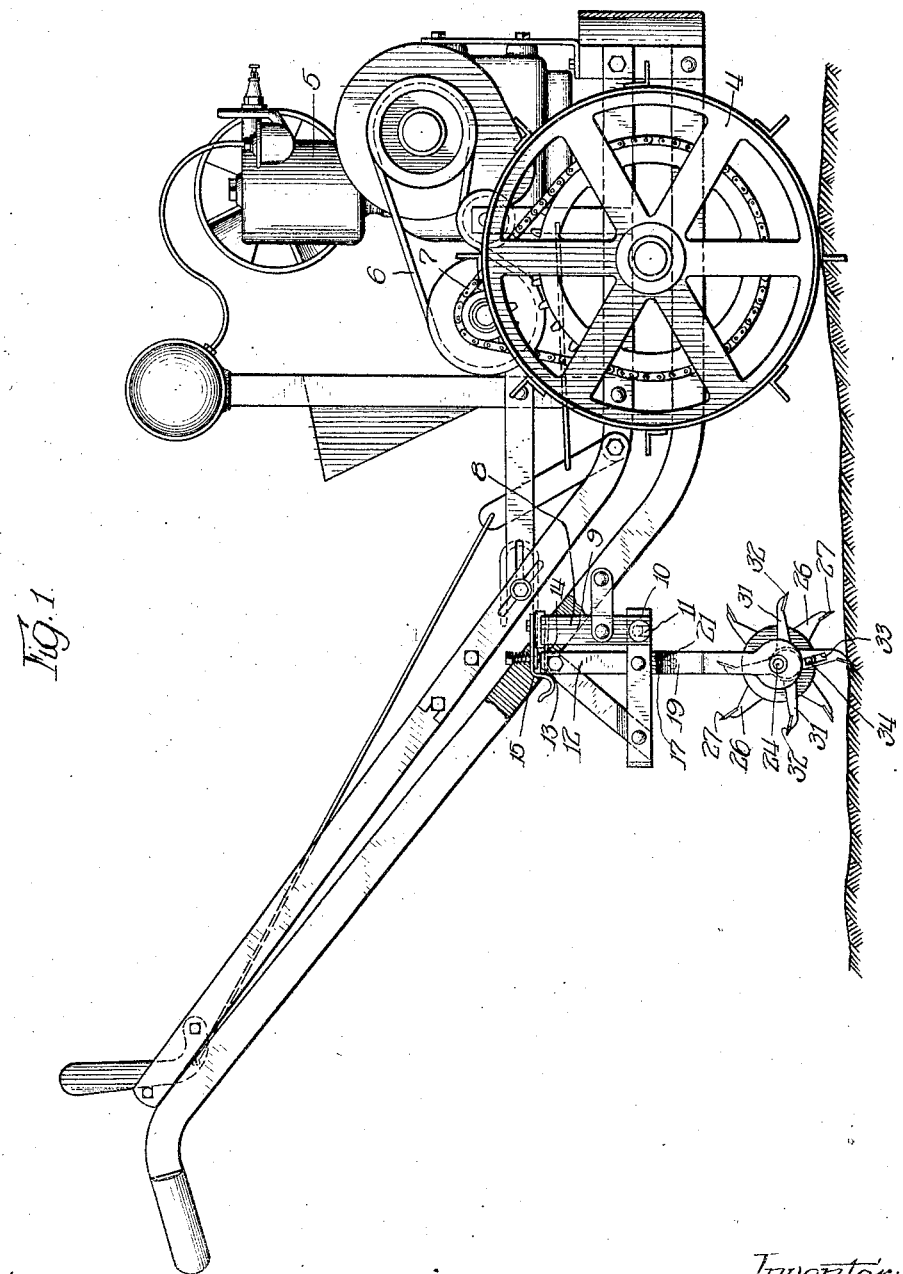

May 25, 1926.
G. T. STRITE
SELF CLEANING HOE
Filed July 2, 1923
1,585,944
2 Sheets-Sheet 2
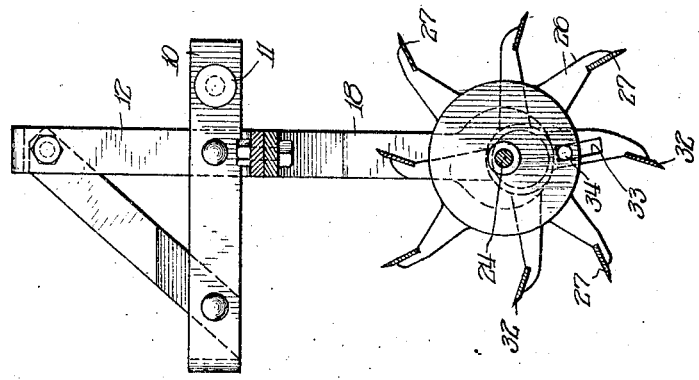
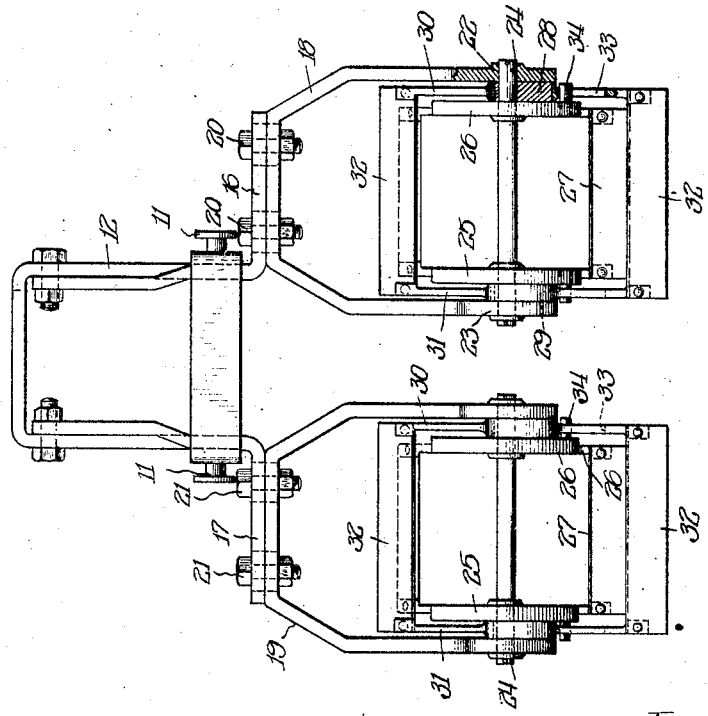

Patented May 25, 1926.

BEST AVAILABLE COPY 1,585,944

UNITED STATES PATENT OFFICE.

GEORGE T. STRITE, OF PORT WASHINGTON, WISCONSIN, ASSIGNOR OF TWO-THIRDS TO HARRY W. BOLENS, OF PORT WASHINGTON, WISCONSIN.

SELF-CLEANING HOE.

Application filed July 2, 1923. Serial No. 648,923.

This invention relates to a new and improved self-cleaning hoe construction and more specifically to a hoe construction in which there is relative movement between adjacent hoes during their operative movement.

Hoes and similar ground working members tend, when working certain soils, or soils in wet condition, to clog with soil that adheres to them and then fail to properly function in working the soil. Further, clods of earth moved by such members as usually designed are merely thrust from the hoes and not crushed and broken as is required in order to adequately cultivate the soil.

It is an object of the present invention to provide a ground working implement construction in which the ground working members are self-cleaning in their normal operation and in which they have relative movement with a consequent crushing action upon the soil.

It is a further object to provide a construction of this character which may be manufactured at small cost and readily applied to existing types of agricultural tractors.

Other and further objects will appear as the description proceeds.

I have illustrated a preferred embodiment of my invention in the accompanying drawings in which—

Figure 1 is an elevation of a garden tractor showing my improved self-cleaning hoes attached thereto;

Figure 2 is a face view partly in section showing the hoe construction on an enlarged scale; and Figure 3 is a view of Figure 2 as seen from the right.

The tractor shown in Figure 1 forms no part of the present invention and need not be described in detail. The wheels 4 are driven by engine 5 through the medium of belt 6 and sprocket chain 7. The hitch frame 8 is provided with a downwardly extending member 9 having a bifurcated lower end 10 adapted to engage the stud 11 of the implement-supporting frame 12. The upper loop 13 of the frame is supported upon the lug 14 and is retained in place by the spring pressed catch 15. This frame and its connection also form no part of the present invention.

To the lateral arms 16 and 17 of the hitch frame, the U-shaped members 18 and 19 are secured by means of the bolts 20 and 21. These bolts pass through slotted openings in the hitch and in the U-shaped members so that the U-shaped members may be adjusted laterally relative to each other and to the hitch.

It will be understood that in the normal operation of the device, the two frames 18 and 19 are located on the opposite side of the row of plants cultivated. The plants pass between the frames and between the wheels of the tractor. Consequently, it is desirable to adjust the cultivating devices laterally to permit a small or large clearance according to the plants operated upon.

The arms of the U-member 18 are provided with bearings 22 and 23 which receive the shaft 24. The spiders 25 and 26 are fitted rotatably upon the shaft 24 and are connected at their outer ends by the hoe members 27. The bosses 28 and 29 extend inwardly from the arms of the U-shaped member, these bosses being circular in form and located eccentrically and downwardly of the axis of the shaft 24. The spiders 30 and 31 are rotatably carried by the bosses 28 and 29, these spiders being connected at their outer ends by the hoe members 32.

The spider 30 is provided with a radially extending slot 33 into which fits the stud 34 carried by spider 26. The interengagement of this stud and slot serves to control the relative movement of the two series of hoes. They are constrained to rotate together but are permitted a relative up-and-down or in-and-out movement caused by the eccentric location of their axes of rotation. The spiders 30 rotate about the axis of the bosses 28 which axis is located below the axis of the shaft 24 about which the spiders 26 rotate. The two series of hoe members therefore describe different circles which, however, coincide at the lowermost point or the point of ground contact and are most widely spaced at their uppermost points.

The entire construction may be quickly applied and removed from the tractor and is adapted for use with various types of tractors, one type only being shown for purposes of illustration.

The in-and-out relative movement of adjacent ground working members serves not only to clean the members of soil which may adhere to them, but also to crush such soil and any soil which may be caught between them.

While the form of construction is adapted to be rotated by the engagement of the hoes with the soil over which the tractor travels, the hoe assemblies may obviously be power driven if desired. I contemplate such changes and modifications to meet varying conditions as may be covered by the scope of the appended claims.

I claim:

1. In a soil working implement, a plurality of spaced series of soil engaging members adapted for movement into and out of engagement with the soil, the members of each series being alternately placed between those of another series, and means whereby the spacing between the series is changed during the movement.

2. In a soil working implement, a plurality of spaced series of soil engaging members adapted to be rotated into and out of engagement with the soil, and means whereby the spacing between the units of the several series is changed during the movement.

3. In a soil working implement, a plurality of series of soil engaging members adapted for movement into and out of engagement with the soil, and eccentric supports for said series whereby the spacing between the units of the several series is changed during the movement.

4. In a soil working implement, a plurality of series of soil engaging members adapted to be rotated, and eccentric supports for said series whereby the spacing between the units of the several series is changed during the movement.

5. In a soil working implement, a plurality of series of soil working members, each series comprising a plurality of members supported upon means adapted to permit rotation of the series to bring the members into and out of engagement with the soil, and means connecting adjacent series whereby they are constrained to rotate together, said adjacent series being eccentrically supported relative to each other whereby their relation varies during their joint rotation.

6. In a soil working implement, a shaft, a pair of spaced spiders rotatably fitted on said shaft, ground working members connecting the outer end of the spider arms, a second pair of spiders located adjacent the outer faces of the first mentioned spiders and rotatably supported eccentrically of the axis of said first spider, and ground working members connecting the outer ends of the arms of the second pair of spiders.

7. In a soil working implement, two pair of spiders mounted upon eccentric axes each pair carrying soil engaging members, and means operatively connecting said members whereby relative movement between the members is limited, the eccentric axes of the two spider assemblies being so related that the ground working members of the two assemblies reach approximately the same plane at their lowermost position.

8. In a soil working implement, a shaft, a pair of spaced spiders rotatably fitted on said shaft, ground working members connecting the outer end of the spider arms, a second pair of spiders located adjacent the outer faces of the first mentioned spiders and rotatably supported eccentrically of the axis of said first spider, ground working members connecting the outer ends of the arms of the second pair of spiders, and means connecting an adjacent spider of each series whereby the two assemblies are constrained to rotate together.

9. In a soil working implement, a shaft, a pair of spaced spiders rotatably fitted on said shaft, ground working members connecting the outer end of the spider arms, a second pair of spiders located adjacent the outer faces of the first mentioned spiders and rotatably supported eccentrically of the axis of said first spider, ground working members connecting the outer ends of the arms of the second pair of spiders, and a pin carried by one spider interfitting with a substantially radial slot formed in the adjacent spider whereby the two assemblies are constrained to move together.

Signed at Port Washington, Wisconsin, this 3rd day of May, 1923.

GEORGE T. STRITE.